Aug. 16, 1955   J. B. McKAY   2,715,565
REACTOR FURNACES
Filed June 26, 1951   2 Sheets-Sheet 1

INVENTOR
James B. McKay
BY
Arthur Middleton
ATTORNEY

Aug. 16, 1955     J. B. McKAY     2,715,565
REACTOR FURNACES
Filed June 26, 1951     2 Sheets-Sheet 2
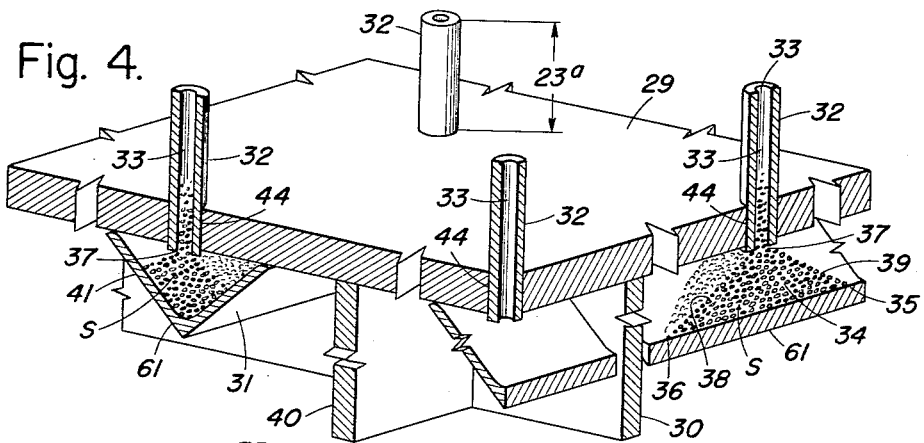
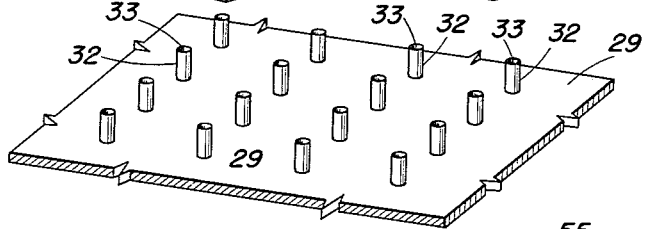
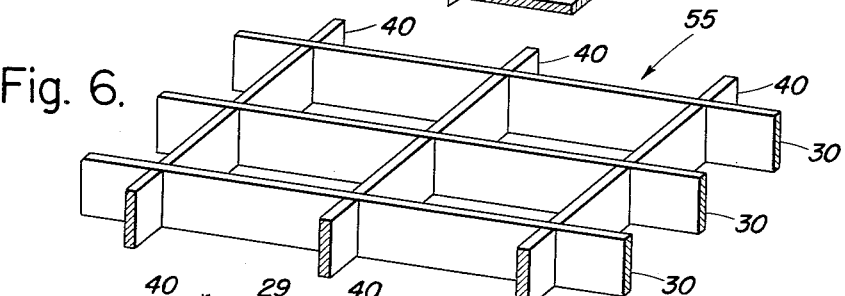
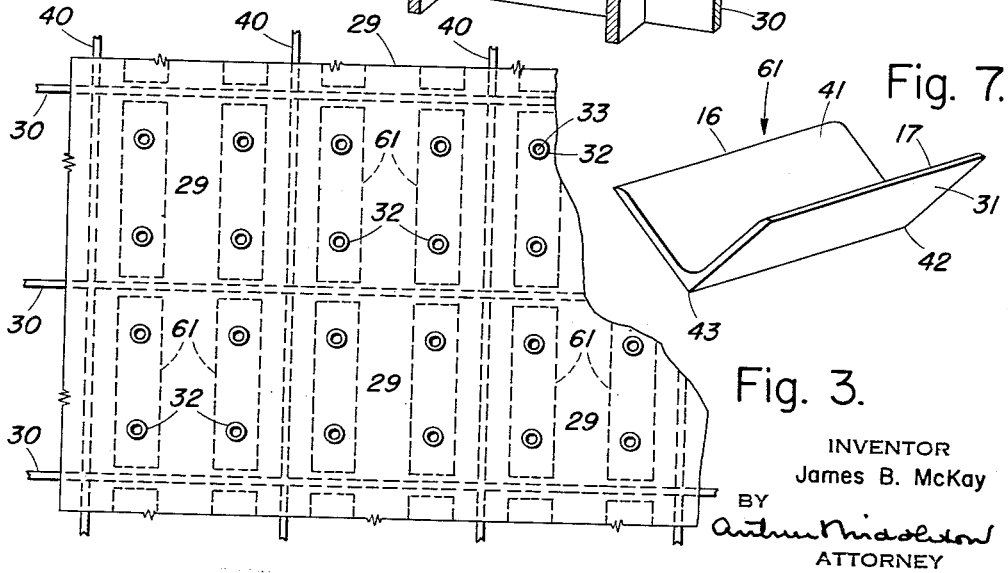
INVENTOR
James B. McKay
BY
Arthur Middleton
ATTORNEY

United States Patent Office 2,715,565
Patented Aug. 16, 1955

2,715,565

REACTOR FURNACES

James B. McKay, Balmertown, Ontario, Canada, assignor to The Dorr Company, Stamford, Conn., a corporation of Delaware Application June 26, 1951, Serial No. 233,579

3 Claims. (Cl. 23—277)

This invention relates to furnaces or reactors for treating a bed of solids under solids-fluidizing conditions. In such a reactor, which is usually a cylindrical closed vessel having a horizontal apertured partition on which is supported a bed of solids to be fluidized by passing a stream of gas uprisingly through the apertured partition to pass through the bed of solids at solids-fluidizing velocity whereby the solids of the bed are fluidized; that is, rendered into turbulent mobility until they act like a boiling liquid. Beneath the partition in the vessel is what is called a windbox from which the gas or air supplied thereto under pressure rises through the apertures or orifices in the partition to fluidize the solids of the bed. The apertured partition is often called a constriction plate, and its function is to be solids-supporting while also gas-permeable and gas-distributive.

Such reactors occasionally have to be shut down for one reason or another, whereupon it is found that upon defluidization of the solids of the bed supported by the constriction plate, the finely-divided solids of the bed, normally smaller in size than the diameter of the apertures in the constriction plate, tend to sift or spill downwardly through the apertures and accumulate in the windbox therebeneath, until the furnace-burden has been undesirably displaced from the furnace into the windbox. So it is an object of this invention to devise ways and means for avoiding this displacement of defluidized solids, whereby upon defluidization, they are substantially all retained in the bed to be available there upon restarting fluidizing operations.

In other words, a principal object of this invention is to provide ways and means for retaining solids in the bed during periods of defluidization, that is to say, during periods when no gas is supplied to uprise through the apertures in the horizontal partition.

Such reactors are used to bring about reactions between solids and gases and to accomplish this, the burden of the bed has to be heated to reaction temperatures. The solids are normally heated to temperatures well above 1000° F. so if they are permitted to sift or spill through the apertures in the constriction plate into the windbox, that box is excessively heated and damage thereto can result. So it is another object of this invention that in providing the constriction plate with accessories that avoid sifting, they be made workable with such heated solids. And it is another object of the invention that the means for non-sifting of solids of the bed into the windbox shall be self-operating to permit refluidization of the solids of the bed upon restarting of the fluidizing gas up through the apertures of the constriction plate. A still further object is to develop means for reducing the pressure drop of the fluidizing gases as they pass through the apertures of the constriction plate.

These and probably other objects of this invention are realizable in a usual reactor of fluidizing type with a gas-permeable bed-supporting apertured partition or constriction plate extending transversely of the vessel with a windbox therebeneath. Since the vessel is normally used in vertical position, the constriction plate is normally horizontal. Usual feeding and discharging means, as well as heating means are used. The advantages of the invention are derived from the non-sifting means associated with the apertures in the constriction plate. Such means include the provision closely subjacent to each aperture, solids-receiving and -retaining means comprising a solids-supporting surface open to the surrounding atmosphere having sufficient area on which rests or reposes a mass of solids sifting down to that surface through an aperture until those solids build a cone of themselves which, because of the angle of repose of such solids, builds up until its apex enters into the aperture from which its solids have sifted or spilled, whereupon that apex forms with the aperture that it enters a sealing or blocking obstruction in the aperture so that no more solids sift therefrom. The solids-supporting surface preferably derives its support from the constriction plate but in such a manner as to have at least one open end or side whereby when the fluidizing gas is restarted it can enter the opening, blow the cone of solids off its support, and enter the apertures in the constriction plate to restart fluidization of the solids of the bed above the plate. By providing the solids-support below the constriction plate, the apertures of the constriction plate may be made larger than normally used because there will be very little sifting and a resulting decrease in pressure drop of the fluidizing gases passing through the apertures can be realized.

A refinement of this invention, that is advantageous for itself although not essential to practical operation under certain conditions, is the provision above each aperture of the constriction plate of a section of pipe rising substantially above the plate. This pipe or tube functions as the principal means for furnishing the fluidizing gases to the bed of solids, and by extending a substantial distance above the constriction plate, delivers the gas into the solids at a point located well above their lowermost extremity. Only those solids located above the point of entry of the gases into the bed will be fluidized as they are the only solids through which the gases will pass. The remaining solids below that point form a defluidized or dead section of the bed whose depth will be determined by the length of the pipe or tube rising above the upper face of the constriction plate. This defluidized section of the bed will act as an insulating medium to protect the metal heat-damageable plate from the high temperatures existing in the fluidized bed. The length of the tube will be determined by the heat-transmitting capacity of the solids forming the defluidized insulation, and will vary with the character of the solids being treated in the fluidized bed.

The invention may be embodied in several specific forms without departing from the spirit or essential characteristics thereof. The present embodiment is therefore to be considered in all respects as illustrative and not restrictive as the scope of the invention is to be determined by the appended claims; and all changes that fall within the meaning and range of equivalents of the claims are therefore intended to be embraced thereby.

Referring now to the accompanying drawings, in which

Figure 3 is a top view of the constriction plate showing the solids-supporting member in place.

Figure 4 is a broken-away perspective view showing in detail the location of the solids-supporting member.

Figures 5 and 6 are perspective views showing the detail of construction of the constriction plate and its supporting grid respectively.

Figure 7 is a perspective view of a section of angle bar used as a solids-retaining member beneath the constriction plate.

Figures 1, 2:
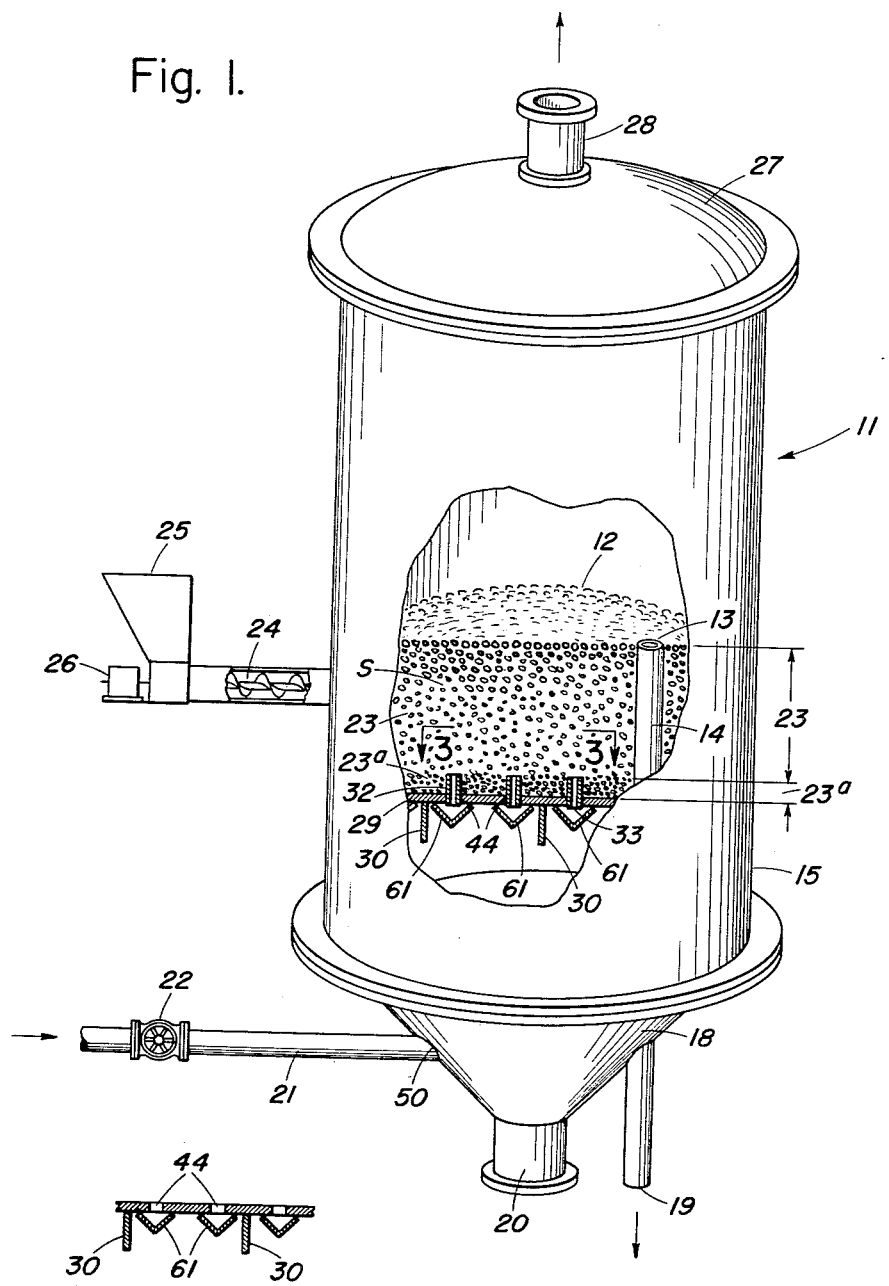
Figure 1 is a cut-away view of a single-bed fluidizing reactor showing the apertured constriction plate in position.
Figure 2 shows a transverse cross section of the apertured constriction plate, the supporting grid, and the solids-supporting means on which solids rest.

More particularly in the drawings, the furnace or reactor 11 comprises outer shell 15 which is completely encapped by top portion 27 and chimney or stack 28. The bottom portion of the reactor 11 comprises conical windbox 18 with its attendant cleanout part 20. Fluidizing gas which is supplied to the reactor 11 is furnished through pipe 21 controlled by valve 22 which pipe enters windbox 18 at point 50. In the reactor 11 there is maintained an ever-changing body or bed 23 of finely-divided solids S supported on a substantially horizontal gas-permeable partition or constriction plate 29. The lower limit of this bed is determined by the constriction plate and the upper limit or fluid-level 12 is determined by the position of the opening 13 of spill-pipe 14. Feed solids being furnished to the bed 23 are placed in hopper 25 from which they are fed to the bed by means of screw-feeder 24 operated by motor 26. As the solids in the bed 23 are fluidized they spill over into spill-pipe 14 and discharge through the lower terminal 19 of it. The constriction plate 29 comprises a flat steel plate containing many orifices, perforations, or apertures 44 in which preferably is located a short section of pipe 32, having a bore 33, welded or otherwise fixedly secured in the constriction plate 29. Gas entering the windbox 18 passes upwardly through these bores 33 of the tubes 32 into the bed of solids at solids-fluidizing velocity and causes a turbulent mobility of those solids resembling a boiling liquid, which today is known various as the fluidized state or the fluidization of solids. To support reinforcingly the expanse of constriction plate which gets so hot that it tends to sag, there is furnished a cross-hatched girder construction or grid 55 comprising a series of girders 30 running in a transverse direction and a series of girders 40 running perpendicular to girders 30 and welded thereto at each juncture. This grid is an important reinforcing means for the constriction plate and must bear the entire weight of the bed of solids being supported above the plate.

In normal operation, when the gas supply is turned off or fails and fluidization ceases, the defluidized solids S of the bed 23 slowly sift downwardly or spill through the tubes 32 into the windbox 18 until they may completely fill this windbox. In order to prevent this occurrence, there is furnished a solids-retaining member or support 61 having a solids-supporting surface on which solids can rest in repose, subjacently positioned immediately below each aperture of the constriction plate. In the drawings this solids-supporting member is shown as an open-ended section of angle bar comprising side 31 and side 41 at least one of whose upper edges 16 and 17 are tack-welded to the lower edge of the constriction plate 29. As the solids sift downwardly through the tubes, they rest upon this support and spread out to form a cone 34 the base of which will have a diameter determined by the angle of repose of the particular solids at the temperature of treatment. In the figures, the cone of solids 34 is shown with a diameter extending from point 35 to point 36 and with its apex determined by the lowermost position of upstanding tube 32. The angle of repose is defined as that formed between the sides 38 or 39 of the cone of solids and the side 35—36. The length of the support 61 must be greater than the diameter 35—36 of the base of the cone, in order that no significant quantity of the solids will spill from the support. At least one end of the support must be open so that the fluidizing gas, when restarted, will enter that end and find its way up through the tubes 32. In this manner there is built up on the solids-supporting surface immediately below the constriction plate a series of small cones of solids each having its apex located in a flow-blocking or sealing position in its corresponding aperture in the constriction plate. If these supports were not provided, the entire windbox would fill up through merging of many large cones having apices located at the lower ends of the tubes in the constriction plate.

As a typical example of a material treated in a fluidizing furnace, using sulfide mineral concentrate consisting essentially of pyrite, pyrrhotite, and arsenopyrite, this was found to have a considerable angle of repose even when the solid particles are at red heat. Its angle of repose is in excess of 25°, which fact is now employed to limit the amount of solids which can flow downwardly through the apertures in the constriction plate. With the use of this invention, when the furnace is shut down the total amount of solids finding their way into the windbox is negligible, whereas without such use the amount of solids passing to the windbox is great enough to impair operation of the furnace. The amount of calcine or solids flowing into the windbox from a constriction plate design utilizing this invention is relatively small. Whereas the solids-supporting means have been thus far described as being a section of angle bar, any sort of surface on which solids can rest in repose will suffice provided its length and width were sufficient to prevent spillage therefrom of defluidized solids that sift on to it through the aperture of the constriction plate; so long as this has a solids-supporting surface of proper area, and is open to the surrounding atmosphere, it could be a strip, a tray or any sort of a member that functions as described.

In Figure 1, the tubes 32 are shown upstanding in the apertures 44 of the constriction plate. They are useful in forming the heat-insulating bed 23a of defluidized solids. Sometimes this insulating section of the total bed is not needed, in which case the tubes 32 can be omitted as shown in Figure 2. These two arrangements are not equivalent, but are useful under different conditions.

I claim:

1. In a reactor for the contacting of finely-divided solids and gases under solids fluidizing conditions, which comprises an enclosed chamber having a gas outlet in its upper section and a gas inlet in its lower section as well as a substantially horizontal partition with gas conducting apertures therethrough dividing the chamber into an upper and a lower compartment where the upper compartment is adapted to contain a bed of finely-divided solids supported by the horizontal partition, means for supplying solids to the upper compartment, means for supplying gas to the gas inlet to pass upwardly through the apertures of the partition into and through the upper compartment at solids fluidizing velocities, and means for conducting solids from the upper compartment to a point remote from both compartments; the improved means for retaining solids in the upper compartment during periods of solids defluidization, which comprises solids supporting surfaces open to the atmosphere of the lower compartment and located one directly subjacent to each of the gas apertures of the partition, said surfaces having dimensions greater than the diameter of the bases of cones formed as solids spill through the apertures to build up on the supporting surfaces with the apices of such cones extending to the apertures from which its solids spill.

2. A reactor according to claim 1, wherein each solids supporting surface comprises a section of angle bar supported from the lower side of the horizontal partition.

3. A reactor according to claim 1 further comprising a gas conducting conduit aligned with each aperture, said conduits extending upwardly from the partition and terminating at an elevation significantly lower than the top of the upper compartment, whereby when solids are fluidized in the upper compartment there will be a section of non-fluidized solids contiguous with and interposed between the partition and the fluidized bed formed by gas passing upwardly from the upper end of said conduits.

References Cited in the file of this patent

UNITED STATES PATENTS

| | | |
|---|---|---|
| 1,802,960 | Simonds | Apr. 28, 1931 |
| 2,394,680 | Gerhold | Feb. 12, 1946 |
| 2,400,176 | Thiele | May 14, 1946 |
| 2,436,157 | Westling | Feb. 17, 1948 |
| 2,471,085 | Wilcox et al. | May 24, 1949 |
| 2,494,337 | Hemminger | Jan. 10, 1950 |
| 2,608,474 | Gilliam | Aug. 26, 1952 |